United States Patent [19]

Nakamura

[11] Patent Number: 4,815,045

[45] Date of Patent: Mar. 21, 1989

[54] SEABED SURVEYING APPARATUS FOR SUPERIMPOSED MAPPING OF TOPOGRAPHIC AND CONTOUR-LINE DATA

[75] Inventor: Takeshi Nakamura, Tokyo, Japan

[73] Assignee: NEC Corporation, Japan

[21] Appl. No.: 860,113

[22] Filed: May 6, 1986

[30] Foreign Application Priority Data

May 7, 1985 [JP] Japan .................................. 60-96219

[51] Int. Cl.$^4$ ............................................... G01S 9/68
[52] U.S. Cl. ......................................... 367/88; 342/25
[58] Field of Search ............... 367/88, 106, 7; 342/25, 342/191, 59, 177

[56] References Cited

U.S. PATENT DOCUMENTS

| | | | |
|---|---|---|---|
| 3,641,484 | 2/1972 | White et al. | 367/88 |
| 3,918,025 | 11/1975 | Koshikawa et al. | 367/7 |
| 3,978,444 | 8/1976 | Hitchcock | 367/88 |
| 4,096,484 | 6/1978 | Ferre et al. | 367/88 |
| 4,216,537 | 8/1980 | Delignieres | 367/88 |
| 4,321,601 | 3/1982 | Richman | 342/191 |
| 4,493,064 | 1/1985 | Odero et al. | 367/88 |
| 4,561,076 | 12/1985 | Gritsch | 367/88 |

Primary Examiner—Thomas H. Tarcza
Assistant Examiner—Tod R. Swann
Attorney, Agent, or Firm—Ostrolenk, Faber, Gerb & Soffen

[57] ABSTRACT

Disclosed is a seabed surveying apparatus wherein a first acoustic fan beam is transmitted to seabed to provide a two-dimensional topographic representation of echoes from successively greater ranges. A second acoustic fan beam is transmitted to seabed to provide a two-dimensional bathymetric representation of echoes returning from equal profiles of the varying topography. The topographic and bathymetric representations are superimposed on a common X-Y coordinate display field.

8 Claims, 1 Drawing Sheet

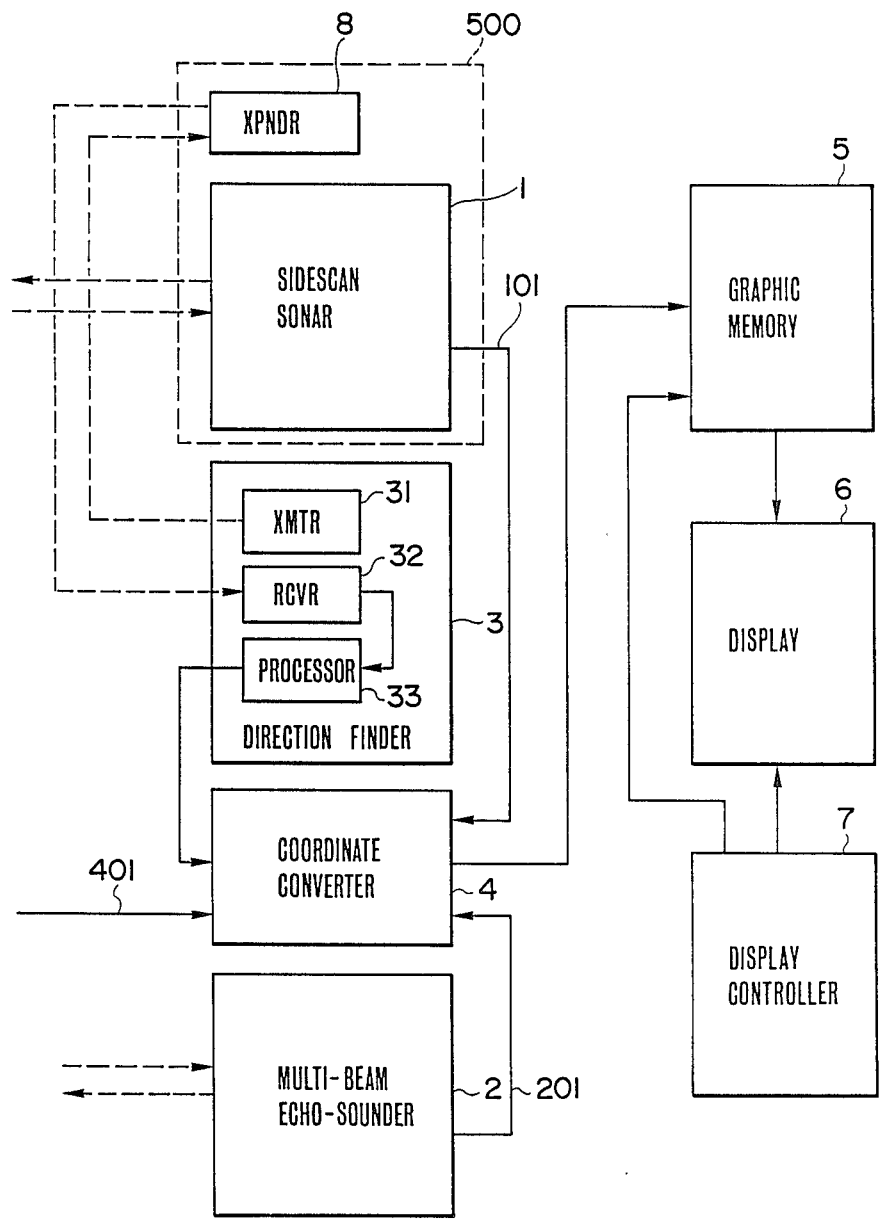

SEABED SURVEYING APPARATUS FOR SUPERIMPOSED MAPPING OF TOPOGRAPHIC AND CONTOUR-LINE DATA

BACKGROUND OF THE INVENTION

The present invention relates to a marine exploration apparatus and more specifically to a seabed surveying apparatus which combines sidescan imaging techniques with hydrophonic techniques to provide a representation of topographic features superimposed on contour lines.

One typical method currently employed in the survey of seabed is sidescan imaging techniques. Sidescan sonar images are a mapping of a visible representation of the strength of acoustic back scattering from the sea floor onto a two-dimensional image medium. Scanning takes place in two directions, i.e. along the survey track and perpendicular to it. Cross-track scanning is achieved by emission of a sound wave through the water and the reception of echoes from successively greater ranges. Along-track scanning is achieved by physical translation of the transducer. In this direction, the object is sampled by a sequence of discrete pulse emission. The result is that the picture elements take on a larger and larger aspect ratio parallel to the track, leading to the impression that all far-range bottom targets have linear structure parallel to the track. One disadvantage of the sidescan imaging is that it lacks bathymetric information and at close ranges the bottom is often undersampled with the possibility of aliasing or missing features.

Another method employed in the survey of seabed is a multi-beam echo-sounder which transmits a narrow fan beam as the surveillance ship moves along a track so that the area of sea floor covered with it corresponds to a rectangular area crossing the track. An array of transducers are responsive to echoes returning from a plurality of successively arranged rectangular areas each crossing the area covered at emission. A plurality of square zones, or pixels, result from the combination of the two sets of intersecting areas. Hydrophonic record is made to plot contour lines with a high degree of resolution at close ranges. However, the resolution degrades at far ranges. Furthermore, due to the inherent discreteness of the data obtained, it is desirable to provide means by which interpolation can be made between successive contour lines.

SUMMARY OF THE INVENTION

It is therefore an object of the present invention to provide a seabed surveying apparatus which compensates for missing topographic features at close ranges and compensates for loss of bathymetric information at far ranges.

This object is obtained by combining sidescan imaging and multi-beam echo-sounding techniques. By the combination of the two techniques, bathymetric information which are derived from contour lines at close ranges serves as an aid for interpretation of short range topographic features which might be lost due to aliasing and continuously varying topographic features which are derived between successive contour lines at long ranges serve as an aid for interpolation of bathymetric data between them.

More specifically, the seabed surveying apparatus of the present invention comprises means for transmitting a first acoustic fan beam to seabed and providing a two-dimensional topographic representation of echoes from successively greater ranges. A second acoustic fan beam is transmitted to seabed to provide a two-dimensional bathymetric representation of echoes returning from equal profiles of the varying topography. The topographic and bathymetric representations are displayed on a common X-Y coordinate system which is preferably the global, latitude and longitude coordinate system.

BRIEF DESCRIPTION OF THE DRAWING

The present invention will be described in further detail with reference to a sole drawing illustrating in a block diagram a seabed surveying apparatus according to an embodiment of the present invention.

DETAILED DESCRIPTION

Referring to the drawing, there is shown a seabed surveying apparatus according to a preferred embodiment of the present invention. The apparatus includes a sidescan sonar 1 and a transponder 8 both mounted on a boat 500 towed by a mother ship which preferably carries on it a multi-beam echo-sounder 2, an underwater three-dimensional position finder 3, a coordinate converter 4, a graphic memory 5, a display unit 6 and a display controller 7. Boat 500 is spaced a sufficient distance from the mother ship to minimize the effect of undesirable sound generated by the screw of the mother ship. Sidescan sonar 1 and transponder 8 receive power from a power source mounted on the mother ship through a power cable carried on the tow line.

Sidescan sonar 1 provides transmission of a sequence of discrete pulses at sampling intervals in a known manner so that they propagate in the form of a fan beam perpendicular to the direction of motion of the boat. Cross-track data is obtained by echoes returning from successively increasing ranges. Sidescan sonar 1 receives returning echoes and converts the returning acoustic energy into amplitude data. A heading sensor such as gyroscope is mounted on the boat to provide a signal indicating the angular deviation of the heading of the boat with respect to an intended direction. The depth of sonar 1 is also detected by a water-column sensor, not shown. Error corrections are performed on the topographic echo signal by processing it in accordance with such sensor signals, so that the corrected echo signal can be plotted along the X-axis of an X-Y coordinate plane on the sea level with the Y-axis being parallel with the direction of movement of sonar 1. Output data from sonar 1 is applied on line 101 to the coordinate converter 4. The varying topography of the sea floor causes high- and low-intensity scattering of acoustic energy. The X- and Y-axis dimensions of the coordinate system are corrected to give rise to a two-dimensional topographic representation with a 1:1 aspect ratio.

Multi-beam echo-sounder 2 transmits a narrow fan beam from the mother ship which tows boat 500 along a track. The area of sea floor covered with the transmitted fan beam corresponds to a rectangular area crossing the track. An array of transducers are mounted on the hull of the ship to define a plurality of successively arranged rectangular areas each crossing the rectangle covered by the transmitted fan beam. The transducers are responsive to echoes respectively returning from square zones, or pixels, resulting from the combination of the intersecting areas to generate bathymetric data. Appropriate corrections are made to eliminate errors arising from point-to-point variations of sound velocity, curved paths of sound rays and the angle of deviation of the mother ship from the reference direction. Since the square zones are arranged in a linear array subtending an angle of about 40 degrees, the bathymetric data representing the distance from the point of emission to each square zone is converted to data indicating the depth of that zone from the sea level. A set of depth indicating data is obtained at intervals as the surveillance ship travels a unit distance. As described in International Hydrophonic Review, Monaco, LVI (1), January 1979, titled Sea Beam, Multi-Beam Echo-Sounding In "Jean Charcot", Description, Evaluation and First Results, by Vincent Renard and Jean-Paul Allenou, Centre Oceanologique de Bretagne, Brest, page 39, the multi-beam echo-sounder 2 includes an echo processor which is programmed to process the X-Y coordinate bathymetric data to obtain contour-line data and applies it on line 201 to the coordinate converter 4.

Coordinate converter 4 provides conversion of the X-Y coordinate systems of topographic and contour-line data into a global coordinate system represented by latitude and longitude. The conversion of coordinate systems requires information on the absolute position of the mother ship on the global coordinate system and information on the relative position of boat 500 to its mother ship.

The mother ship's position can be obtained by any one of known radio navigation systems such as Navy Navigation Satellite System (NNSS), Loran C, and Decca and applied on line 401 to the coordinate converter 4.

For detecting the relative position of boat 500, underwater position finder 3 includes a command-signal transmitter 31, a 3-channel receiver 32 and a processor 33. Transmitter 31 provides emission of a command signal into the water, which is received by the transponder 8 on boat 500 which returns a response signal to the mother ship upon receipt of the command signal. Three-channel receiver 32 on board the mother ship includes a set of three transducers arranged according to a known position finding technique such as Super Short Base Line, for example. Processor 33 detects phase differences between the outputs of the receiver 32 and the time interval between the emission of the command signal and the reception of the response signal and provides computations of the detected parameters to determine the distance between the mother ship and boat 500, the bearing of the boat and the angle of depression of the boat. The boat's position signal obtained by the position finder 3 and the ship's position signal from any of the known navigational systems are applied to the coordinate converter 4. Converter 4 includes a pair of graphic memories each having storage cells arranged in a coordinate pattern into which the outputs of sidescan sonar 1 and multi-beam echo-sounder 2 are respectively stored. A data processor is included to compute on the position signals to determine the timing at which each memory is to be read and the angles of orientation of the X-Y coordinates of the topographic and contour-line data with respect to the absolute global coordinate system. The graphic memories are read by the determined timings and angles of orientation so that the both topographic and contour-line data can be plotted on the global coordinate system.

The outputs of coordinate converter 4 are applied to the graphic memory 5. The topographic and contour-line data are written into respective storage areas of memory 5 under control of the display controller 7. The stored data are read out of the memory 5 under control of the display controller into display unit 6.

By the combination of the sidescan sonar 1 and multi-beam echo-sounder 2, bathymetric information which is derived from contour lines at close ranges may serve as an aid for interpretation of short range topographic features which might be lost due to aliasing. Since the object is sampled by a sequence of discrete pulse emissions and the result is that the picture elements take on a larger and larger aspect ratio parallel to the track, leading to the impression that all far-range bottom targets have linear structure parallel to the track. Therefore, continuously varying topographic features are derived between successive contour lines at long ranges may to serve as an aid for interpolation of bathymetric data between them.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A seabed surveying apparatus mounted on a vessel moving along a track, comprising:
   sidescan sonar means for transmitting a first acoustic fan beam to a seabed and for providing a tow-dimensional topographic representation of echoes of said first acoustic fan beam returning form successively greater ranges in a direction perpendicular to said track, said topographic representation having intensities corresponding to highlights and shadows of a varying topography of a portion of the seabed being examined;
   hydrophonic means for transmitting a second acoustic fan beam to the seabed and for providing contour lines by a two-dimensional bathymetric representation of echoes of said second acoustic fan beam returning from equal profiles of said varying topography; and
   means for displaying said topographic and bathymetric representations in a common coordinate system.

2. A seabed surveying apparatus as claimed in claim 1, further comprising means for converting the dimensions of said topographic and bathymetric representations to the dimensions of said common coordinate system, said common coordinate system being a global coordinate system.

3. The apparatus of claim 1, in which said sidescan sonar and said hydrophonic means are spaced from one another and including a transponder adjacent said sidescan sonar and a transmitter adjacent said hydrophonic means and means, cooperating with said transponder and said transmitter, for detecting the position of said sidescan sonar relative to said hydrophonic means.

4. The apparatus of claim 1, in which said hydrophonic means comprises a multi-beam echo-sounder.

5. A seabed surveying apparatus, comprising:
   a sidescan sonar for transmitting a first acoustic fan beam to a seabed and for providing a survey map in a first X-Y coordinate system by a two-dimensional topographic representation of echoes of said first acoustic fan bean returning from successively greater ranges, said topographic representation having intensities corresponding to highlights and shadows of a varying topography of a portion of he seabed being examined;

hydrophonic means for transmitting a second acoustic fan beam to the seabed and providing contour lines in a second X-Y coordinate system by a two-dimensional bathymetric representation of echoes of said second acoustic fan bean returning from equal profiles of said varying topography;

means for converting said first and second X-Y coordinate systems into a global coordinate system; and means for displaying said survey map and said contour lines on said global coordinate system.

6. The apparatus of claim 5, in which said sidescan sonar and said hydrophonic means are spaced from one another and including a transponder adjacent said sidescan sonar and a transmitter adjacent said hydrophonic means and means, cooperating with said transponder and said transmitter, for detecting the position of said sidescan sonar relative to said hydrophonic means.

7. The apparatus of claim 5, in which said hydrophonic means comprises a multi-beam each-sounder.

8. A seabed surveying system, comprising:

a sidescan sonar mounted on a first vessel moving along a tract for transmitting a first acoustic fan beam to a seabed and for providing a survey map in a first X-Y coordinate system by a two-dimensional topographic representation of echoes of said first acoustic fan beam returning from successively greater ranges in a direction perpendicular to said track with intensities corresponding to highlights and shadows of a varying topography of a portion of the seabed being examined;

hydrophonic means mounted on a second vessel moving with said first vessel for transmitting a second acoustic fan beam to said seabed and for providing contour lines in a second X-Y coordinate system by a two-dimensional bathymetric representation of echoes of said second acoustic fan beam returning form equal profiles of said varying topography;

means for detecting the relative positions of said vessels to each other and the absolute position of one of said vessels in a global coordinate system;

means for correcting the orientations of said first and second coordinate systems in accordance with the detected positions of said vessels and for converting the corrected first and second X-Y coordinate systems into said global coordinate system; and means for displaying said survey map and said contour lines on said global coordinate system.

* * * * *